United States Patent [19]

Kalt et al.

[11] Patent Number: 5,486,230
[45] Date of Patent: Jan. 23, 1996

[54] STABLE MOULDING MATERIAL AND SPINNING MATERIAL CONTAINING CELLULOSE

[75] Inventors: Wolfram Kalt, Lenzing; Johann Männer, Weyregg; Dieter Eichinger, Vöcklabruck; Christoph Schrempf, Bad Schallerbach, all of Austria

[73] Assignee: Lenzing Aktiengesellschaft, Austria

[21] Appl. No.: 351,466

[22] PCT Filed: Apr. 29, 1994

[86] PCT No.: PCT/AT94/00055

§ 371 Date: Dec. 6, 1994

§ 102(e) Date: Dec. 6, 1994

[87] PCT Pub. No.: WO94/25492

PCT Pub. Date: Nov. 10, 1994

[30] Foreign Application Priority Data

May 5, 1993 [AT] Austria ................... A886/93

[51] Int. Cl.$^6$ ............ C09D 101/24; C09D 101/22; C09D 101/08; C09D 101/00

[52] U.S. Cl. ............ 106/165; 106/176; 106/186; 106/203

[58] Field of Search ................ 106/165, 176, 106/186, 203

[56] References Cited

U.S. PATENT DOCUMENTS

| 4,426,228 | 1/1984 | Brandner et al. | 106/203 |
| 5,216,144 | 6/1993 | Eichinger et al. | 536/56 |

*Primary Examiner*—David Brunsman
*Attorney, Agent, or Firm*—Brumbaugh, Graves, Donohue & Raymond

[57] ABSTRACT

A stable moulding material and spinning material containing cellulose, a tertiary amine-oxide, particularly N-methylmorpholine-N-oxide and optionally water, as well as a stabiliser, characterized in that as said stabiliser a mixture of glucosides of gallic acid and m-digallic acid is provided. The stabiliser employed according to the invention is superior to gallic acid propyl ester in the longterm-stabilisation of cellulose dissolved in a tertiary amine-oxide.

5 Claims, No Drawings

STABLE MOULDING MATERIAL AND SPINNING MATERIAL CONTAINING CELLULOSE

This application is a 371 of PCT/AT94/00055 filed Apr. 29, 1994

The present invention concerns a stable moulding material and spinning material containing cellulose and an aqueous tertiary amine-oxide. The present invention further concerns the use of special stabilisers for the stabilisation of the cellulose dissolved in a tertiary amine-oxide.

From U.S. Pat. No. 2,179,181 it is known that tertiary amine-oxides have the property of dissolving cellulose and that from these solutions cellulosic fibres may be obtained by precipitation. A process for the preparation of such solutions is known for instance from EP-A-0 356 419. According to this publication, first a suspension of cellulose in an aqueous tertiary amine-oxide is prepared. The amine-oxide contains up to 40% by weight of water. The aqueous cellulose suspension is heated, and while reducing pressure water is withdrawn until the cellulose dissolves.

During dissolving and also during storage of the solution at a higher temperature, a degradation of the cellulose and the solvent occurs. The degradation products may discolour to a considerable extent the moulded bodies, for instance fibres and sheets, obtained after precipitation, and their recovery during recuperation of chemicals may require a considerable effort. The latter however is necessary in order to avoid a pollution of the environment.

EP-A-0 047 929 recommends utilization of gallic acid propyl ester (GPE) as a stabiliser. It has been shown however that the stabilising effect of this compound lasts only a relatively short time, so that a heated cellulose solution has to be processed quickly. Furthermore, GPE is expensive and also its solubility in polar solution media, such as water, leaves something to be desired. It is the objective of the invention to provide a stabiliser which does not exhibit the above drawbacks and is able to stabilise the dissolved cellulose against degradation for a longer period of time than GPE.

According to the invention, this objective is attained by using a mixture of glucosides of gallic acid and m-digallic acid for the stabilisation of the cellulose against degradation.

Further, the invention concerns a stable moulding material and spinning material respectively containing cellulose, a tertiary amine-oxide, particularly N-methylmorpholine-N-oxide (=NMMO), and optionally water, as well as a stabiliser, wherein as said stabiliser a mixture of glucosides of gallic acid and m-digallic acid is provided.

A preferred embodiment of the stable moulding material and spinning material according to the invention contains tannic acid as a stabiliser.

According to dispensatories, tannic acid [CAS 1401-55-4] is defined as a mixture of esters of the D(+) glucose with gallic acid and m-digallic acid. Substances wherein all alcoholic OH groups of the glucose are esterified with gallic acid and m-digallic acid are preferred, being particularly preferred that the m-digallic acid represents a percentage of 40% to 90% of the total of gallic acid and m-digallic acid.

Tannic acid is also present in the so-called tannins, which according to the invention may also be employed as stabilisers. Thus a further preferred embodiment of the stable moulding material and spinning material respectively according to the invention contains tannin as a stabiliser.

Tannins are products which are employed for tanning at an industrial scale. Both vegetable and synthetic substances are used, the vegetable products being obtained by means of extraction from natural materials, such as woods and plants. It has been shown according to the invention that both vegetable tannins and tannic acid itself exhibit good stabilisation properties for cellulose in tertiary amine-oxides. It has been found that under the usual conditions of the preparing of a solution the degradation of cellulose is slowed down and a reduced degradation of the tertiary amine-oxide is observed.

It has been shown that the stabilisers used according to the invention give very good results even at concentrations of no more than 0,05% by weight (based on the cellulose). This concentration is lower than the concentration recommended in the art for gallic acid propyl ester. Therefore a particularly preferred embodiment of the moulding material and spinning material respectively according to the invention contains the stabiliser in a concentration of no more than 0,05% by weight, based on the mass of the cellulose.

By means of the following Example, the invention will be explained in more detail.

EXAMPLE

For preparing the solution, an aqueous solution with 70% by weight of NMMO was used. This NMMO solution was mixed with cellulose, and in a laboratory kneader water was evaporated at a pressure of 250 mbar and a temperature of approximately 95° C., dissolving the cellulose. The amounts were chosen such that the obtained solution contained 10% by weight of cellulose, 15% of water and 75% of NMMO.

30 minutes and 750 minutes after the dissolution of the cellulose, the viscosity of the solution was measured by means of a Bohlin rheometer (measurement temperature: 120° C.). The obtained results are indicated in the following Table as "Comparative Example".

Afterwards, the above procedure was repeated twice, except adding GPE (concentration: 0,05%, based on cellulose) and tannic acid respectively (concentration: 0,05%, based on cellulose; Tannic Acid from Aldrich Chemicals) as a stabiliser. The results are also indicated in the following Table.

TABLE

| Stabiliser | Viscosity (Pa.s) | |
|---|---|---|
| | after 30 min. | after 750 min. |
| Comparative Example (without stabiliser) | 753 | 18 |
| GPE | 985 | 383 |
| Tannic acid | 985 | 755 |

From the Table it can be seen that when GPE was used as a stabiliser, the viscosity of the solution decreased to a significantly lower value than with the use of tannic acid. This means that during a period of 750 min. (=12 hours 30 minutes) tannic acid is able to stabilise the cellulose better against degradation than GPE.

Similarly good results were obtained also with other mixtures of glucosides of gallic acid and m-digallic acid.

We claim:

1. A stable composition for moulding or spinning containing cellulose, a tertiary amine-oxide, particularly N-methylmorpholine-N-oxide, and a stabiliser, and optionally water, characterized in that as said stabiliser a mixture of glucosides of gallic acid and m-digallic acid is provided.

2. A composition according to claim 1, characterized in that tannic acid is provided as said stabiliser.

3. A composition according to claim 1, characterized in that tannin is provided as said stabiliser.

4. A composition according to one of the claims 1 to 3, characterized in that said stabiliser is contained in a concentration of no more than 0,05% by weight, based on the mass of cellulose.

5. The use of a mixture of glucosides of gallic acid and m-digallic acid for the stabilisation of a composition for moulding or spinning containing cellulose and a tertiary amine-oxide.

* * * * *

UNITED STATES PATENT AND TRADEMARK OFFICE
CERTIFICATE OF CORRECTION

PATENT NO. : 5,486,230

DATED : January 23, 1996

INVENTOR(S) : Wolfram Kalt, Johann Männer, Dieter Eichinger and Christoph Schrempf It is certified that error appears in the above-indentified patent and that said Letters Patent is hereby corrected as shown below:

Col. 2, lines 64-65, "particularly N-methylmorpholine-N-oxide, and a stabiliser," should read --and a stabilizer--

Col. 2, line 66, "stabiliser" should read --stabilizer--

Col. 3, line 2, "stabiliser" should read --stabilizer--

Col. 3, line 4, "stabiliser" should read --stabilizer--

Col. 3, line 6, "stabiliser" should read --stabilizer--

Col. 4, delete claim 5 and substitute therefor: --5. A method of stabilizing a composition for moulding or spinning containing cellulose and a tertiary amine-oxide comprising adding a mixture of glucosides of gallic acid and m-digallic acid.--

Signed and Sealed this

Eighteenth Day of June, 1996

Attest:

BRUCE LEHMAN

Attesting Officer        Commissioner of Patents and Trademarks